(12) United States Patent
Nguyen et al.

(10) Patent No.: US 6,813,808 B2
(45) Date of Patent: Nov. 9, 2004

(54) QUICK CHANGED, SELF-CONTAINED, ADJUSTABLE VACUUM BAG SYSTEM

(75) Inventors: Peter Dzung Nguyen, San Diego, CA (US); Alan Graham Worrell, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 10/062,823

(22) Filed: Jan. 31, 2002

(65) Prior Publication Data

US 2003/0140448 A1 Jul. 31, 2003

(51) Int. Cl.$^7$ ............................................. A47L 9/14
(52) U.S. Cl. ................................... 15/352; 15/347
(58) Field of Search ......................... 15/339, 347, 352, 15/350; 408/67; 83/100; 451/456; 409/137

(56) References Cited

U.S. PATENT DOCUMENTS

| | | | |
|---|---|---|---|
| 1,543,191 A | * 6/1925 | Saurenman et al. ........... | 15/347 |
| 4,361,957 A | * 12/1982 | Krotz et al. ................... | 83/100 |
| 4,957,148 A | 9/1990 | Shoda | |
| 5,033,917 A | 7/1991 | McGlasson et al. | |
| 5,533,557 A | 7/1996 | Jedlicka et al. | |
| 5,581,842 A | 12/1996 | Seith | |
| 5,605,421 A | * 2/1997 | Hodgson ..................... | 408/67 |
| 5,613,989 A | 3/1997 | Bosses | |
| 5,680,704 A | 10/1997 | Okubo et al. | |
| 5,688,298 A | 11/1997 | Bosses | |
| 5,689,852 A | 11/1997 | Svoboda et al. | |
| 5,716,488 A | 2/1998 | Bryant | |
| 5,937,888 A | 8/1999 | McKiernan et al. | |
| 5,960,829 A | 10/1999 | Sigler | |
| RE36,627 E | 3/2000 | Pink et al. | |
| 6,200,075 B1 | 3/2001 | Gaskin et al. | |
| 6,206,621 B1 | 3/2001 | Sebring | |

OTHER PUBLICATIONS http://www.right-tool.com/right-tool/drywallsander.html.

* cited by examiner

Primary Examiner—Theresa T. Snider
(74) Attorney, Agent, or Firm—Shimokaji & Associates, P.C.

(57) ABSTRACT

A quick change, self-contained vacuum system includes a debris container with an input opening and a pressure head that is configured to receive a fluid under a high pressure and which includes a low pressure inlet and an exhaust port. A guide pin may be provided along with a body that is selectively engageable with the pressure head and the guide pin. The body includes a bore having a first port communicating with the exhaust port of the pressure head and a second port communicating with the input opening of the debris container. The vacuum system further includes a shutoff valve that is operable in response to movement of the guide pin. In operation, movement of the guide pin relative to the body in one direction establishes locking engagement of the pressure head and the body along with a response by the shutoff valve to establish fluid communication between the exhaust port of the pressure head and the input opening of the debris container. Movement of the guide pin relative to the body in another direction provides for separation of the pressure head and the body and response by the shutoff valve to prevent fluid communication between the first port of the bore and the input opening of the debris container.

26 Claims, 6 Drawing Sheets

QUICK CHANGED, SELF-CONTAINED, ADJUSTABLE VACUUM BAG SYSTEM

GOVERNMENT RIGHTS

This invention was made with Government support under Contract F33657-96-C2059 awarded by the Air Force. The Government has certain rights in this invention.

BACKGROUND OF THE INVENTION

The present invention relates to an apparatus for collecting debris and, more particularly, to a vacuum system that may have a debris container that may be self-contained to prevent spills and may be quickly changed and that may have an adjustable vacuum pressure level.

Portable vacuum tools and hand tools having vacuum tool attachments are well-known useful devices for collecting debris during fabrication, assembly and general clean up activities, e.g., in a factory. A typical vacuum tool is shown generally at 10 in FIG. 1. The vacuum tool 10 has a body 12 connected via a connector 13 to a high-pressure line 14 providing air pressure at about 90–100 psi, a low pressure outlet 16 at which vacuum action is attained and an exhaust pipe 18. A debris container or bag 20 is mounted by a retention wire 22 (dotted line) on the exhaust pipe 18. The bag 20 includes an opening (not shown) at the bottom that may be closed by a clamp 24. In operation, high-pressure air from high-pressure line 14 is introduced into the body 12 through an orifice (not shown) which is configured to channel air in the direction of arrow 26 and into bag 20. In this way, a vacuum is created at the low pressure outlet 16 that, when placed in the proximity of, e.g., a hand tool (not shown) creating debris, such as drill chips and the like, causes the debris to pass into the bag 20.

Typical use of vacuum tools in a factory requires the repeated emptying and, if necessary, the replacing of filled vacuum bags 20. For example, assembly mechanics are required to stop working on a particular task, leave a work station carrying the tool, and either empty the bag or, if the bag is in bad shape such as being tainted with drill lubricant, clogged with dust, or losing vacuum performance, replace it with a new one. In order to do so, mechanics typically obtain additional tools such as pliers, a screw driver, a piece of metal retaining wire, cleaning solvent, rags and protective hand gloves.

Figure 1:
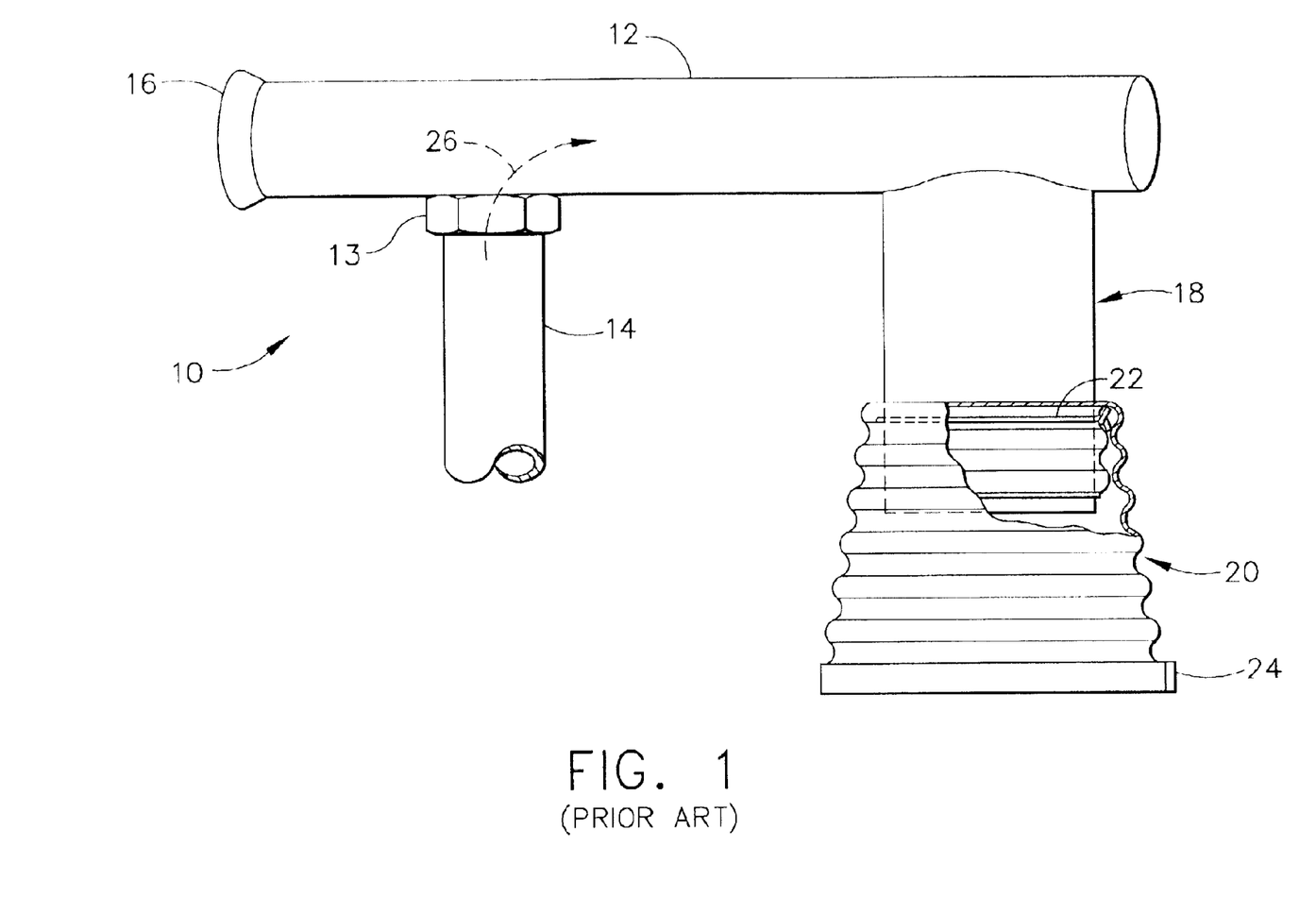
FIG. 1 is a diagram showing a prior art vacuum tool.

Emptying a filled vacuum bag can be an unpleasant, messy job since the bags may contain, for example, drilled chips from drill motors, such as the Hi-Speed Drill Kit, which are sharp and which may cause injury. To make matters worse, the chips are often mixed with lubricant and therefore tend to stick to anything they come in contact with. The vacuum bag 20 may be emptied by removing a the clamp 24 so that the contents may fall out. The bag 20 may then be inspected, and if it is determined that a new bag is required, the bag must be turned inside out until the retention wire is exposed, which may cause any chips left inside the bag to fall out. Use of the pliers and/or the screw driver may be required to remove the retention wire 22 and separate the bag 20 from the vacuum tool 10. The bag 20 may then be slid out of the vacuum tool 10 and be replaced with a new one. When installing a new bag, the new bag must be turned inside out and slid onto the exhaust pipe 18 of the vacuum tool 10. A new retention wire 22 is used to wrap an upper portion of the bag 20 onto the exhaust pipe 18. Pliers are needed to twist the two ends of the wire together until it wraps around tight enough to hold the bag 20 in place. Usually it is the case that during the process of removing the old bag, some remaining chip debris falls out requiring additional clean up. For applications where debris is dry, such as floor dust or composite dust, replacing a new bag may cause some of these debris to become airborne which may cause a safety and/or health hazard concern in a working environment.

After the old bag is replaced, testing of the tool with a new bag is usually carried out to insure it is functioning properly. In addition where the tool is attached to a portable hand tool, the whole tool is usually tested to be sure it functions properly before mechanics return to their work station. Also, mechanics' hands may contact the oil-tainted chips and may need to be washed before they can go back to their work station to resume their tasks.

In confined areas, where access is limited and getting in or out is not easy, mechanics may tend to wait until the next break time to empty or replace a vacuum bag. In such a situation, the continuous use of a filled bag may lose up to 75% of the vacuum performance.

Accordingly, there is a need for an improved vacuum system that is self-contained to prevent spills and is quickly changed in order to increase the time available for performing more valuable tasks.

SUMMARY OF THE INVENTION

According to one aspect of the present invention, a quick change, self-contained vacuum system comprises a debris container having an input opening and a pressure head that is configured to receive a fluid under a high pressure and may have a low pressure inlet and an exhaust port. A guide may be provided along with a body that is selectively engageable with the pressure head and the guide. The body comprises a bore having a first port communicating with the exhaust port of the pressure head and a second port communicating with the input opening of the debris container. The vacuum system further comprises a shutoff valve that is operable in response to movement of the guide. In operation, movement of the guide relative to the body in one direction establishes locking engagement of the pressure head and the body along with a response by the shutoff valve to establish fluid communication between the exhaust port of the pressure head and the input opening of the debris container. Movement of the guide relative to the body in another direction provides for separation of the pressure head and the body and response by the shutoff valve to prevent fluid communication between the first port of the body and the input opening of the debris container.

In another aspect of the invention, a quick change, self-contained vacuum system, is presented. The self-contained vacuum system may comprise a movable pressure head that is configured to receive a fluid under a high pressure and that comprises a low pressure inlet, an exhaust port and a guide pin extending away from the pressure head. An inner member that comprises a bore having a first opening that is in fluid communication with the exhaust port of the pressure head and a second opening that is in fluid communication with the first opening. The inner member may be operatively engageable with the guide pin of the pressure head. An outer member may be provided which is in slidable relationship with the inner member and the pressure head. The outer member may comprise a helical slot that is dimensioned and configured to receive the guide pin of the pressure head whereby the guide pin may move therewithin and the outer member may further comprise an aperture. A shutoff valve may also be provided that is operable in response to movement of the guide pin. In operation, selective movement of the guide pin relative to the outer member in one direction causes movement of the shutoff valve for establishing fluid communication from the exhaust port of the pressure head, through the first and second openings of the inner member and to the aperture of the outer member. Movement of the guide pin relative to the outer member in another direction causes movement of the shutoff valve for preventing fluid communication from the exhaust port, through the first and second openings of the inner member and to the aperture.

In a further aspect of the invention, a quick change, self-contained vacuum system having a debris bag, comprises a movable pressure head that is configured to receive a fluid under a high pressure and includes a low pressure inlet, an exhaust port and a guide pin extending away from the pressure head. The vacuum system also comprises an inner member that includes a sleeve having a bore that includes a first opening that is in fluid communication with the exhaust port of the pressure head and a second opening that is in fluid communication with the first opening. The inner member may be operatively engageable with the guide pin of the pressure head and the inner member also may comprise a mounting portion including radially spaced slots and an outer surface having an increasing diameter. The vacuum system also includes an outer member comprising a sleeve disposed in concentric relationship with the inner member and the outer member comprises a helical slot dimensioned and configured to receive the guide pin of the pressure head whereby the guide pin may move therewithin. The outer member further comprises an aperture, an end disposed within the input opening of the debris bag and an inner tapered surface disposed at an angle with respect to a central axis of the outer member which corresponds to that of the outer surface of the inner member. A shutoff valve that is operable in response to movement of the guide pin is also provided. In operation, selective movement of the guide pin relative to the outer member in one direction causes movement of the shutoff valve for establishing fluid communication from the exhaust port of the pressure head, through the first and second openings of the inner member and to the aperture of the outer member. Movement of the guide pin relative to the outer member in another direction causes movement of the shutoff valve for preventing fluid communication from the exhaust port, through the first and second openings of the inner member and to the aperture of the outer member.

These and other features, aspects and advantages of the present invention will become better understood with reference to the following drawings, description and claims.

BRIEF DESCRIPTION OF THE DRAWINGS

FIG. 3a is an end view of a pressure head in accordance with the embodiment of FIG. 2;

FIG. 3b is a sectional view taken along line 3b of FIG. 3a;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

An improved vacuum system is provided by the present invention that is self-contained to prevent spills and is quickly changed in order to increase the time available for performing more valuable tasks. The vacuum system may be employed in connection with a hand tool such that it may allow a mechanic to quickly empty and/or replace the bag without fear of spillage. In particular, rather than requiring movement of a hand tool with a debris container to a remote location, the vacuum system of the present invention allows quick release of the vacuum bag and containment during movement thereof. This is in order to prevent spills and to reduce loss of work time associated with prior art devices.

Figures 2, 2A:
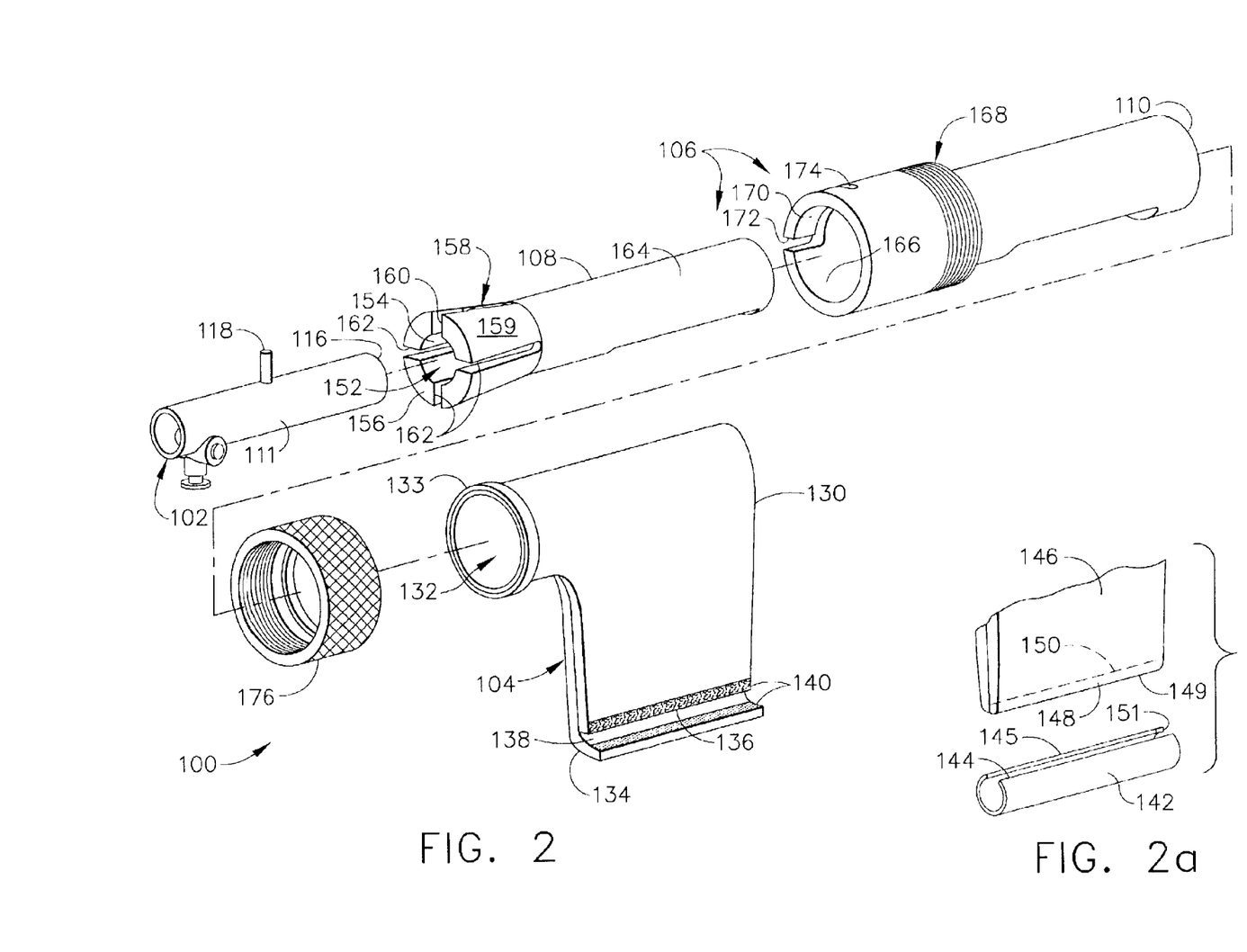
FIG. 2 is an exploded view, in perspective, of a quick change, self contained vacuum system in accordance with one embodiment of the present invention.
FIG. 2a is a partial view, in perspective, of an optional sealing mechanism for the vacuum bag of FIG. 2.

Referring to FIG. 2, a quick change, self-contained vacuum system is illustrated in an exploded state and is shown generally at 100. The vacuum system 100 may comprise a pressure head 102, a debris container 104, and a body 106 that may comprise an inner member 108 and an outer member 110.

Figures 3A, 3B:
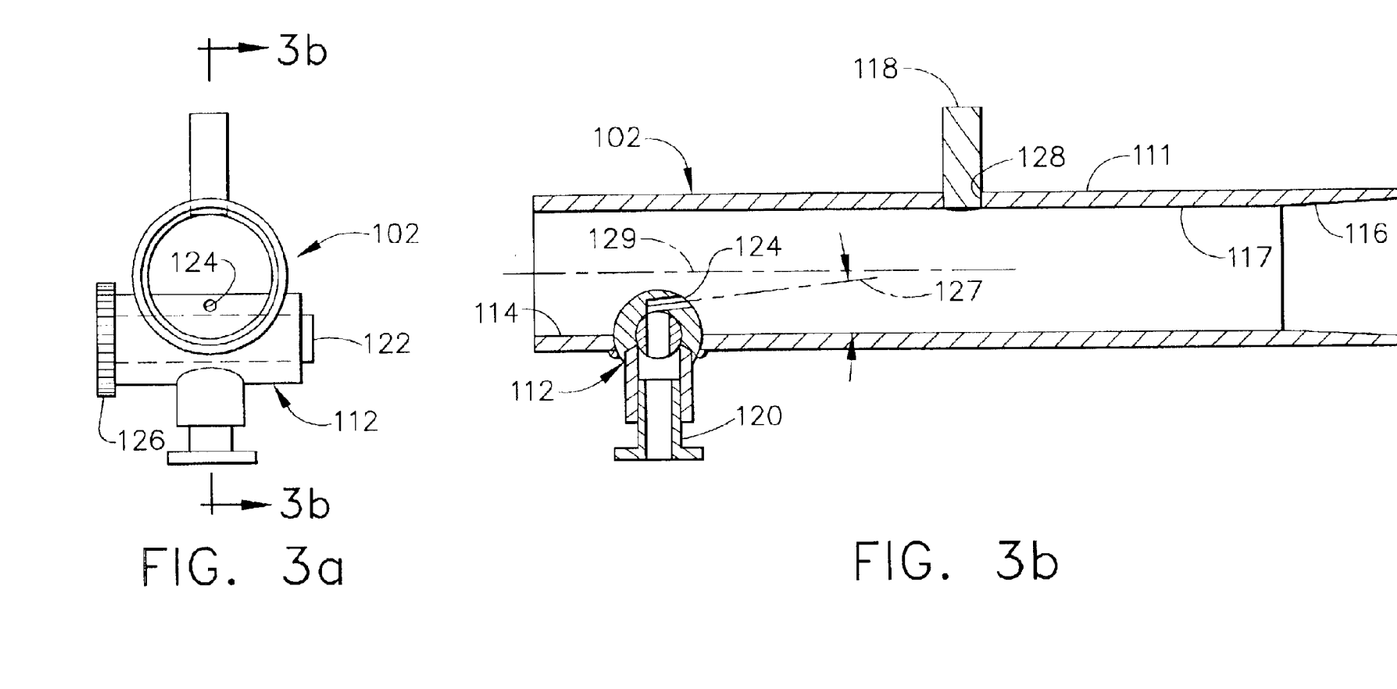

As best seen in FIGS. 3a and 3b the pressure head 102 may be generally cylindrical in outer configuration and may be composed of any suitably strong and durable material such as a metallic substance. One suitable material may be aluminum for its well-known strength, durability and ease in manufacture. The pressure head 102 may comprise a cylindrical wall 111, a high-pressure interface 112, a low pressure inlet 114, an exhaust port 116, a central bore 117 and a guide or guide pin 118.

The high-pressure interface 112 may comprise a high-pressure connector 120, a control valve 122 (FIG. 3b) and a high-pressure outlet 124. The high-pressure connector 120 is configured in a well-known manner to receive a fluid, such as air, at a high pressure, e.g., between approximately 90 and 100 psi. Typically, in a manufacturing environment, high pressure air is available on a network basis as "shop air" and is communicated by, e.g., a flexible hose with a connector (both not shown) which is capable of mating with the connector 120.

The control valve 122 may be provided for varying the flow of fluid into the central bore 117 of the pressure head 102 and comprises a lever 126 (FIG. 3a). Movement of lever 126 allows a mechanic to vary the volume of air passing through high-pressure outlet 124 and, in turn, vary the pressure level provided at the inlet 114 where removal of debris from a work area, such as from drill bits, occurs. It has been found that a pressure level of between approximately three (3) and eight (8) inches of mercury is suitable for the vacuuming of drilled chips from most hand-held drill motors (not shown). Varying the pressure level at inlet 114 also allows a mechanic to accommodate for different chip sizes and thereby optimize tool performance versus air consumption. In particular, it will be appreciated that where the chip sizes tend to be relatively smaller, a mechanic may adjust the lever 126 to reduce the flow of air out of high-pressure outlet 124 and thereby "save" air. However, the pressure level at inlet 114 would be somewhat higher than that which would be required to move relatively larger chip sizes.

Also, it will be appreciated that additional appropriate structure may be provided so that the inlet 114 may communicate with the surrounding volume of a drill bit of a drill motor. Further details of such a structure are provided, for example, in U.S. Pat. No. 5,033,917 to McGlasson et al, the entire contents of which is incorporated herein by reference.

The high-pressure outlet 124 may be oriented so that the fluid escapes in the direction of exhaust port 116 thereby creating a low pressure at the low pressure inlet 114. Preferably, a central axis 127 of the high-pressure outlet 124 is disposed at an angle which ranges between approximately 6 and 7 degrees with respect to a central axis 129 of the pressure head 102.

The guide pin 118 may be composed of a strong and durable material such as a steel and is mounted in a recess 128 of the cylindrical wall 111. The guide pin 118 is preferably dimensioned to extend radially outward a sufficient distance from the cylindrical wall 111 so that, when the pressure head 102 is assembled to the body 106 (described below), the guide pin 118, and in turn the pressure head, may be slid or rotated by hand with respect to the body.

Referring again to FIG. 2, the debris container 104 may be preferably a debris bag 130, however, it will be understood that other suitably configured debris containers may be employed in the practice of this invention. The debris bag 130 may be composed of, e.g., a cloth or woven material such as a woven nylon, or paper, and may function as a filter so that debris carried by the high-pressure fluid from the pressure head 102 will be screened from the high-pressure fluid. The debris bag 130 may be generally rectangular in outer configuration and may comprise an input opening 132 defined by a rim 133 and a sealable bottom portion 134. The input opening 132 may be dimensioned to fit over the outer member 110 (described in more detail below), is preferably tubular in configuration and extends from the debris bag 130.

The sealable bottom portion 134 may comprise an open end 136, a tab portion 138 and a well-known hook and loop fastener 140 such as that sold under the mark VELCRO. The hook and loop fastener 140 may include a hooks portion (not separately numbered) mounted to the tab portion and loops portion (also not separately numbered) mounted to the bottom portion 134. In order to close the debris bag 130, the hooks portion and the loops portion are pressed together.

In an optional embodiment, as illustrated in FIG. 2a, rather than using a tab portion and a hook and loop fastener, a tubular clamp 142 may be employed for sealing purposes. The tubular clamp 142 may be composed of any suitably strong material such as a plastic and may comprise a slot 144 defined by edges 145 which, when mounted to a debris bag 146, clamps a lower end 148 together at about broken line 150. The material thickness of the debris bag at broken line 150 may be less than that of a bottom edge 149 to thereby maintain a tight clamping action on the lower end 148. Also, edges 145 may include a chamfered portion 151 that increases the size of the slot 144 at one end thereof (not numbered) for ease in assembly with the debris bag 146.

Figure 4:
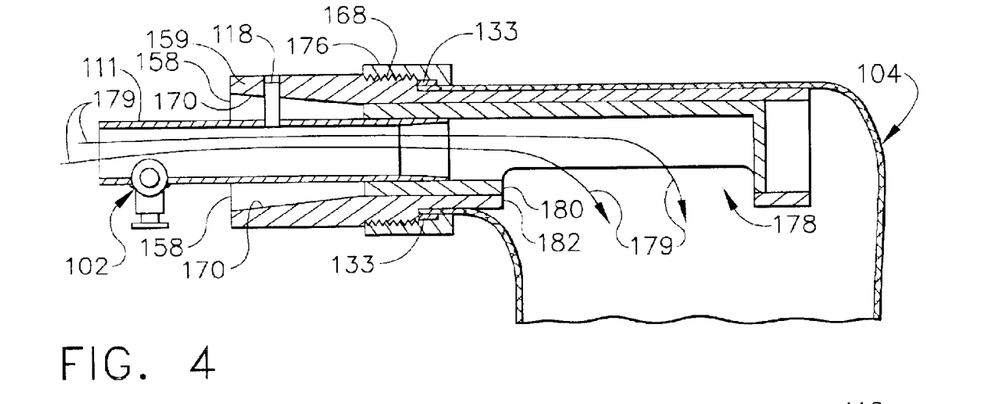
FIG. 4 is a cross sectional view of the quick change, self-contained vacuum bag of FIG. 2 when assembled.
Figures 6, 6A, 6B:
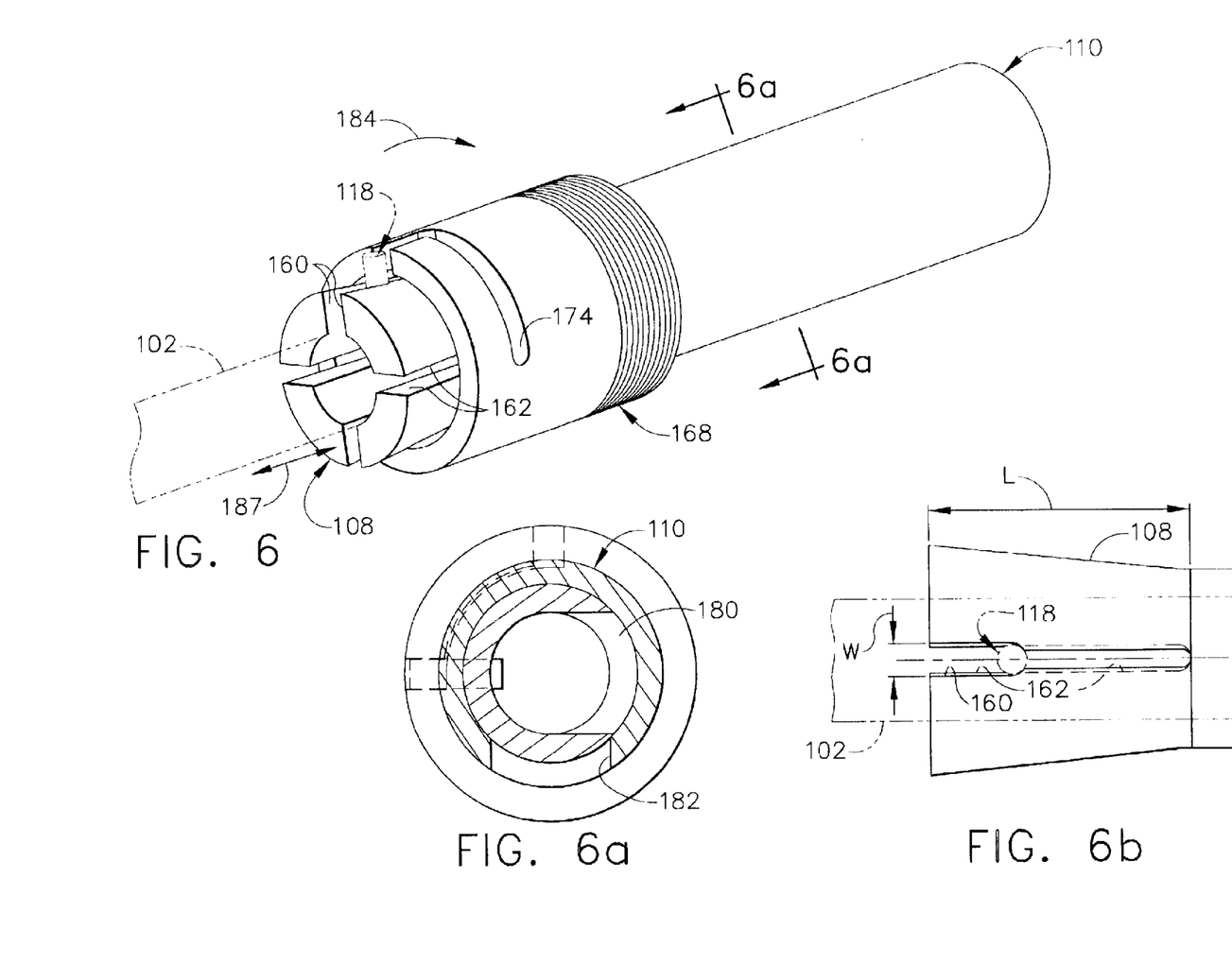
FIG. 6 is a perspective view, partially in phantom, of a pressure head, an inner member and an outer member in a nearly closed state in accordance with the embodiment of FIG. 2.
FIG. 6a is a sectional view taken along line 6a of FIG. 6.
FIG. 6b is a top view of the pressure head and the inner member of FIG. 6.

As depicted in FIG. 2, the inner member 108 may be preferably tubular in configuration and, more preferably a sleeve, and may be composed of aluminum, similar to the composition of the pressure head 102 discussed above. The inner member 108 may include a central bore 152 communicating with an opening 154 at a first end 156. The central bore 152 may have an inner diameter which is sufficiently large to receive at least a portion of the cylindrical wall 111 including the exhaust port 116 of the pressure head 102. Also located at the first end 156 may be a mounting portion 158 comprising a first slot 160 along with second slots 162. Referring now also to FIG. 6, the first slot 160 may be dimensioned such that the guide pin 118 may be received therein so that, when the inner member 108 is mated with the pressure head 102, both may be fixed together for simultaneous movement. The second slots 162 may be dimensioned shorter in a width W than the first slot 160 but longer in a length L and may function to increase the flexibility or spring of the mounting portion 158 and thereby provide a gripping action when clamped, as discussed in more detail below, to the pressure head 102. Referring now also to FIG. 4, the mounting portion 158 includes an outer surface 159 that may be of decreasing outer diameter in order to provide a clamping action with the outer member 110 as discussed below. The inner member 108 also may comprise a constant outer diametrical portion 164 for mating with the outer member 110 described below.

As shown in FIGS. 2 and 4, the outer member 110, similar to the inner member 108, also may be composed of aluminum, is preferably tubular in configuration and, more preferably, comprises a sleeve. The outer member 110 also may include a central bore 166, a threaded portion 168, an inner tapered portion 170, a slot 172 and a helical slot 174. The central bore 166 may include an inside diameter that may be dimensioned to receive the inner member 108 therewithin. The threaded portion 168 may be configured to receive a nut 176 that may be connected to the rim 133 of the debris container 104 to thereby retain the latter on the outer member 110. In this way, the debris container 104 may be easily replaced by removal of nut 176.

As best seen in FIG. 4, the inner tapered portion 170 may be tapered at an angle that corresponds to the angle of the tapered outer surface 159 of mounting portion 158. The slot 172 communicates with the helical slot 174 and both may be dimensioned of a sufficient size to receive the guide pin 118 therewithin.

Figures 5, 5A:
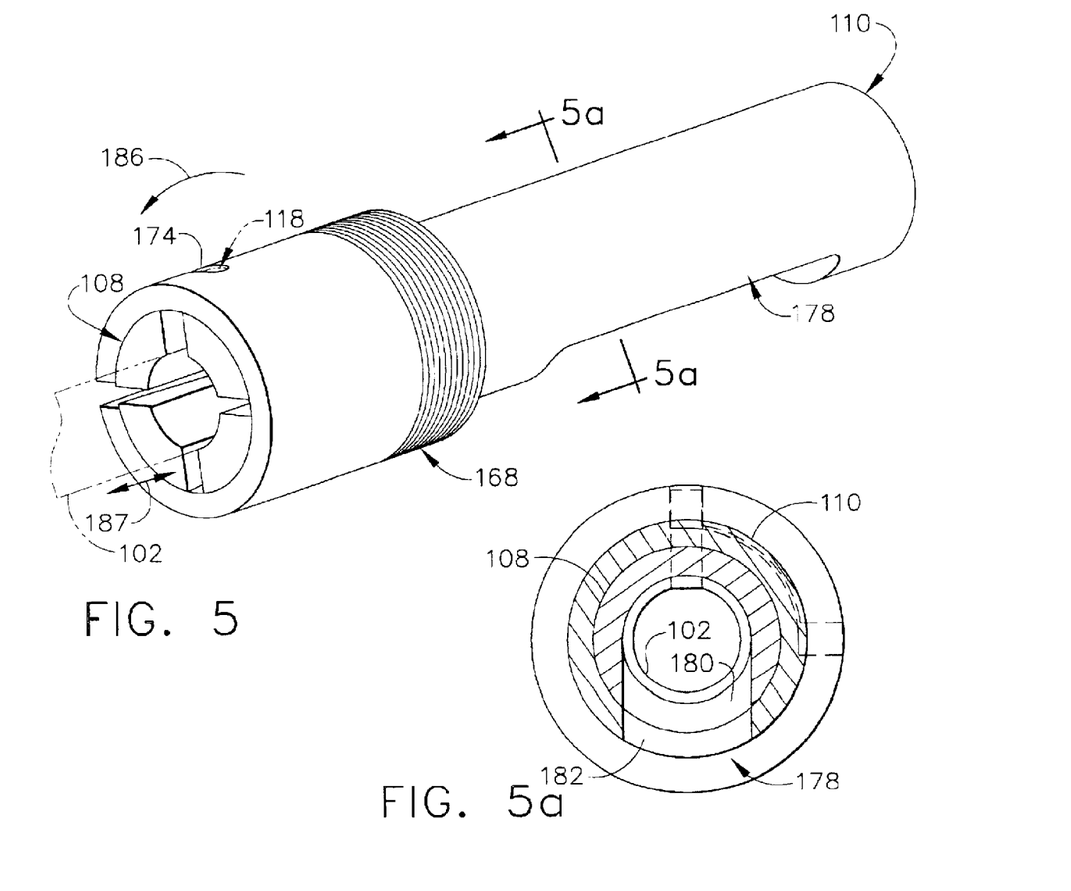
FIG. 5 is a perspective view, partially in phantom, of a pressure head, an inner member and an outer member in an open state in accordance with the embodiment of FIG. 2.
FIG. 5a is a sectional view taken along line 5a of FIG. 5.

Referring to FIGS. 4, 5 and 6, axial movement of the inner member 108 causes guide pin 118 to move into the slot 172 and then rotation of the inner member 108 with respect to outer member 110, causes the guide pin to move within the helical slot 174. Because of this rotation, a clamping force may be exerted by the outer member 110 via contact with the mounting portion 158 of the inner member 108 against the cylindrical wall 111 of the pressure head 102. In particular, the inner tapered portion 170 may ride up and over the tapered outer surface 159 thereby pressing the latter adjacent the pressure head 102. The inner member 108 and outer member 110 are thereby clamped to the pressure head 102.

The vacuum system 100 may also comprise a shutoff valve 178 for preventing debris once collected in the debris container 104 from leaving the debris container when the inner member 108 and outer member 110 are separated from the pressure head 102. In a first embodiment shown in FIGS. 2 and 4 the shutoff valve 178 may comprise an opening 180 located on the inner member 108 and an aperture 182 located on the outer member. In operation, the shutoff valve 178 may be open allowing air represented by arrows 179 to pass therethrough when the opening 180 is aligned with the aperture 182 as shown in FIGS. 4, 5 and 5a. Referring now to FIGS. 6 and 6a, the shutoff valve 178 may be closed when the opening 180 and the aperture 182 are not aligned after rotation of the inner member 108 with respect to the outer member 110 represented by arrow 184. At this time, rotation in the direction of arrow 186 (FIG. 5) may cause the shutoff valve 178 to become open again.

Referring again to FIGS. 2, 5 and 6, the debris bag 130 may be connected to or separated from the pressure head 102 by rotation of the outer member 110 relative to the pressure head 102 and guide pin 118. During this relative rotation, the shutoff valve 178 functions to open or close such that it is open when the debris bag 130 is connected to the pressure head 102 and is closed when separated from the latter. In particular, FIGS. 5 and 6 show in phantom the pressure head 102 and linear movement relative to the inner member 108 and the outer member 110. Accordingly, a mechanic or operator may, in this way, quickly separate the vacuum bag 130 without fear of spilling any of the contents thereof and bring the vacuum bag 130 to a remote location for emptying the contents. As illustrated in FIG. 2, if it is determined that the vacuum bag requires replacement, it may then be quickly removed from the outer member 110 by removal of nut 176.

Figure 7:
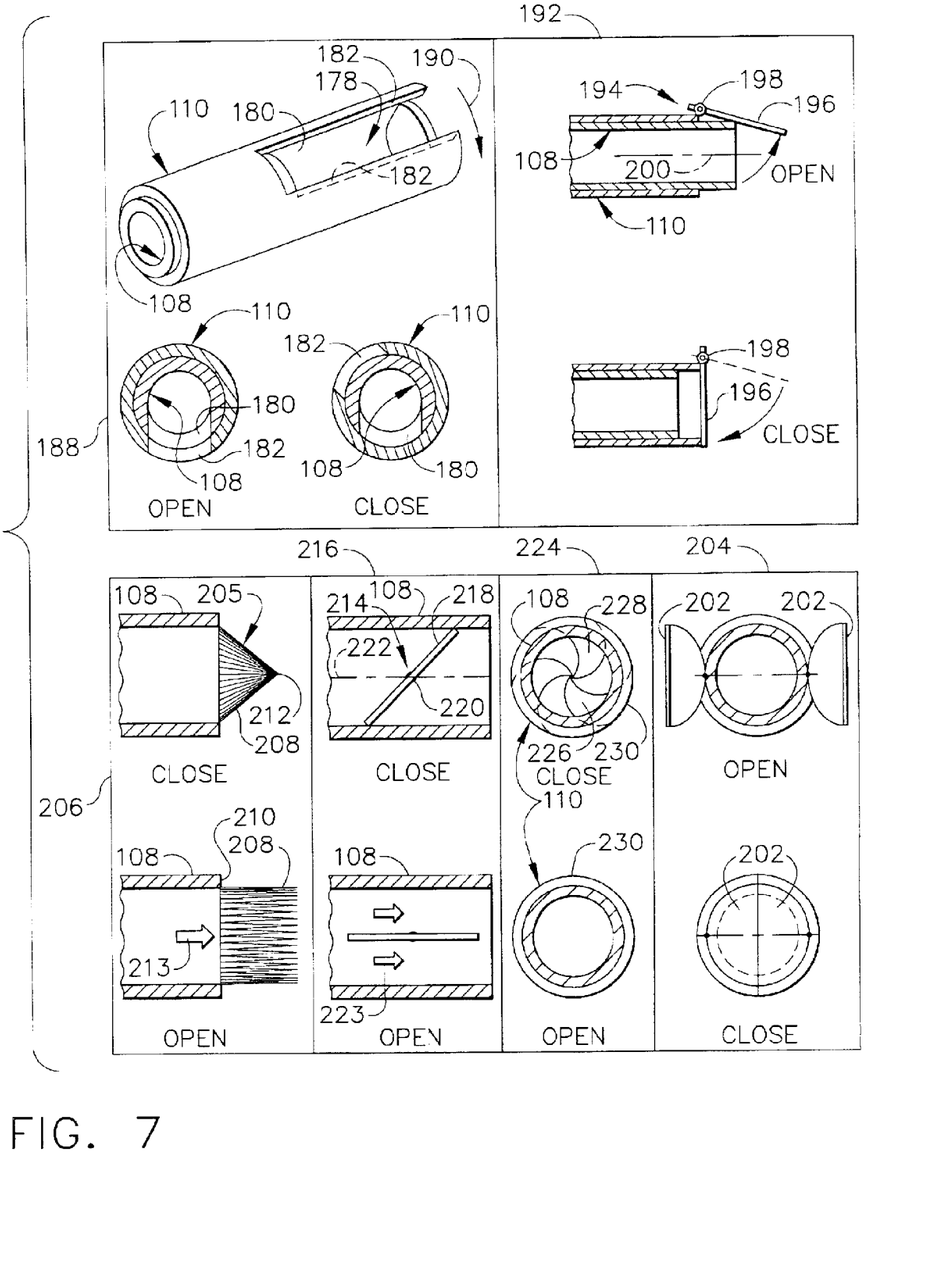
FIG. 7 is a series of diagrams showing various embodiments of a shut off valve usable in the practice of the present invention.

Referring now to FIG. 7, a series of views are presented which illustrate optional embodiments of the shutoff valve 178. Box 188 illustrates an embodiment, similar to that described above, wherein the inner member 108 may include an opening 180 and the outer member 110 includes an aperture 182 and wherein there may be relative movement between the inner member 108 and the outer member 110 in the direction of arrow 190 in order to open or close the shutoff valve 178.

In another embodiment illustrated in box 192, a shutoff valve is illustrated generally at 194 and may comprise a flap 196 which may be mounted to the outer member 110 by a suitable spring loaded mounting bracket 198 which biases the flap in a closed position. In order to open or close the flap 196, the inner member 108 may be moved along a central axis 200. Optionally, the flap 196 may be composed of two flaps 202 each mounted by spring loaded mounting brackets (not numbered) as illustrated in box 204.

Another embodiment of a shutoff valve 205 is illustrated in box 206. There, a heart valve 208 is provided which may comprise a flexible material such as a flexible plastic/rubber composition that is configured to collapse and thereby close the inner member 108 based on the lack of fluid pressure. In order to do so, one end 210 may be mounted to the inner member 108 with the other end 212 remaining free. Accordingly, fluid pressure in the direction of arrow 213 causes opening of the heart valve 208.

A further embodiment of a shutoff valve 214 is illustrated in box 216. In this embodiment, the shutoff valve 214 may comprise a throttle valve 218 mounted within the inner member 108. The throttle valve 218 may be centrally hinged at 220 such that it may rotate into alignment with a central axis 222 of the inner member 108 because of fluid pressure in the direction of arrow 223.

As illustrated in box 224, a shutoff valve 226 comprises a diaphragm including a plurality of hinged plates 228 which may be moved into a closed or open position in a known manner via an outer-positioned ring 230.

It should be understood, of course, that the foregoing relates to preferred embodiments of the invention and that modifications may be made without departing from the spirit and scope of the invention as set forth in the following claims.

We claim:

1. A quick change, self-contained vacuum system having a debris container with an input opening, comprising:
   a pressure head configured to receive a fluid under a high pressure and comprising a low pressure inlet and an exhaust port;
   a guide;
   a debris container comprising an input opening;
   a body being selectively engageable with the pressure head and the guide and comprising a bore having a first port communicating with the exhaust port of the pressure head and a second port communicating with the input opening of the debris container; and
   a shutoff valve being operable in response to movement of the guide relative to the body;
   wherein movement of the guide relative to the body in one direction establishes locking engagement of the pressure head and the body along with response by the shutoff valve to establish fluid communication between the exhaust port of the pressure head and the input opening of the debris container and movement of the guide relative to the body in another direction provides for separation of the pressure head and the body and response by the shutoff valve to prevent fluid communication between the first port of the body and the input opening of the debris container.

2. The quick change, self-contained vacuum system of claim 1 wherein the guide comprises a guide pin that is affixed to the pressure head.

3. The quick change, self-contained vacuum system of claim 2 wherein the body comprises an inner member having a first opening in fluid communication with the exhaust port of the pressure head and a second opening in fluid communication with the first opening and an outer member configured for relative movement therewith.

4. The quick change, self-contained vacuum system of claim 3 wherein:
   the inner member comprises a mounting portion including radially spaced slots and an outer surface of increasing diameter; and
   the outer member comprises a helical slot and an inner tapered surface disposed at an angle with respect to a central axis of the outer member which corresponds to that of the outer surface of the inner member.

5. The quick change, self-contained vacuum system of claim 4 wherein the guide pin is received within one of the radially spaced slots of the inner member and the guide pin is also received within the helical slot of the outer member such that the inner member, the outer member and the pressure head are locked together.

6. The quick change, self-contained vacuum system of claim 3, wherein the inner and outer members are sleeves.

7. The quick change, self-contained vacuum system of claim 6 wherein the debris container comprises a bag.

8. The quick change, self-contained vacuum system of claim 3, wherein the shutoff valve comprises an aperture disposed on the outer member and wherein movement of the guide pin in one direction causes movement of the outer member such that the aperture is aligned with the second opening of the inner member and movement of the guide pin in another direction causes movement of the outer member such that the second opening and the aperture are not aligned.

9. The quick change, self-contained vacuum system of claim 3, wherein the shutoff valve comprises:
   a flapper valve mounted to the outer member and being biased closed and the flapper valve being openable by sliding movement of the inner member.

10. The quick change, self-contained vacuum system of claim 3, wherein the shutoff valve comprises:
a pair of doors mounted to the outer member and both being biased closed and the pair of doors being openable by sliding movement of the inner member.

11. The quick change, self-contained vacuum system of claim 3, wherein the shutoff valve comprises:
a diaphragm valve mounted within the inner member and being operable by an outer-positioned ring whereby the diaphragm valve is closable to prevent passage of fluid from the pressure head through the second port of the body.

12. The quick change, self-contained vacuum system of claim 1, wherein the shutoff valve comprises:
a heart valve mounted to the body and being biased to close the second port of the body, the heart valve being openable by a predetermined pressure of fluid in the pressure head.

13. The quick change, self-contained vacuum system of claim 1, wherein the shutoff valve comprises:
a throttle valve mounted within the bore of the body and being biased to prevent passage of fluid from the pressure head through the second port of the body, the throttle valve being openable by a predetermined pressure of fluid in the pressure head.

14. The quick change, self-contained vacuum system of claim 1 wherein the pressure head comprises a valve for adjusting a fluid pressure level of the low pressure inlet.

15. A quick change, self-contained vacuum system, comprising:
a movable pressure head configured to receive a fluid under a high pressure and comprising a low pressure inlet, an exhaust port and a guide pin extending away from the pressure head;
an inner member comprising a bore having a first opening that is in fluid communication with the exhaust port of the pressure head and a second opening that is in fluid communication with the first opening, the inner member being operatively engageable with the guide pin of the pressure head;
an outer member in slidable relationship with the inner member and the pressure head, the outer member comprising a helical slot dimensioned and configured to receive the guide pin of the pressure head whereby the guide pin may move therewithin and the outer member further comprising an aperture; and
a shutoff valve being operable in response to movement of the guide pin;
wherein selective movement of the guide pin relative to the outer member in one direction causes movement of the shutoff valve for establishing fluid communication from the exhaust port of the pressure head, through the first and second openings of the inner member and to the aperture of the outer member and movement of the guide pin relative to the outer member in another direction causes movement of the shutoff valve for preventing fluid communication from the exhaust port, through the first and second openings of the inner member and to the aperture.

16. The quick change, self-contained vacuum system of claim 15 wherein the inner member and the outer member each comprise a sleeve.

17. The quick change, self-contained vacuum system of claim 16 wherein the inner member and the outer member are concentrically disposed.

18. The quick change, self-contained vacuum system of claim 17, wherein the shutoff valve is opened by movement of the guide pin in one direction such that the second opening of the inner member is aligned with the aperture of the outer member and wherein the shutoff valve is closed by movement of the guide pin in another direction such that the aperture and the second opening are not aligned.

19. The quick change, self-contained vacuum system of claim 17, wherein the shutoff valve comprises:
a flapper valve mounted to the outer member and being biased to close the aperture of the outer member and the flapper valve being openable by sliding movement of the inner member.

20. The quick change, self-contained vacuum system of claim 17, wherein the shutoff valve comprises:
a pair of doors mounted to the outer member and both being biased to close a port of the outer member and the pair of doors being openable by sliding movement of the inner member.

21. The quick change, self-contained vacuum system of claim 16 wherein the guide pin is received within one of the slots of the inner member and the guide pin is also received within the helical slot of the outer member such that the inner member, the outer member and the pressure head are locked together.

22. The quick change, self-contained vacuum system of claim 15 wherein:
the inner member comprises a mounting portion including radially spaced slots and an outer surface of increasing diameter; and
the outer member comprises an inner tapered surface disposed at an angle with respect to a central axis of the outer member which corresponds to that of the outer surface of the inner member.

23. The quick change, self-contained vacuum system of claim 15, further comprising a debris container with an input opening and wherein an end of the outer member is disposed within the input opening of the debris container.

24. The quick change, self-contained vacuum system of claim 23 wherein the debris container comprises a bag.

25. The quick change, self-contained vacuum system of claim 15 wherein the pressure head comprises a valve for adjusting a fluid pressure level of the low pressure inlet.

26. A quick change, self-contained vacuum system having a debris bag, comprising:
a movable pressure head configured to receive a fluid under a high pressure and comprising a low pressure inlet, an exhaust port and a guide pin extending away from the pressure head, the pressure head comprises a valve for adjusting a fluid pressure level of the low pressure inlet;
an inner member comprising a sleeve having a bore including a first opening that is in fluid communication with the exhaust port of the pressure head and a second opening that is in fluid communication with the first opening, the inner member being operatively engageable with the guide pin of the pressure head, the inner member also comprising a mounting portion including radially spaced slots and an outer surface of increasing diameter;
a debris bag comprising an input opening;
an outer member comprising a sleeve disposed in concentric relationship with the inner member, the outer member comprising a helical slot dimensioned and configured to receive the guide pin of the pressure head whereby the guide pin may move therewithin and the outer member further comprising an aperture and an end disposed within the input opening of the debris bag, the outer member further comprising an inner tapered surface disposed at an angle with respect to a central axis of the outer member, said angle equal to a taper angle of the outer surface of the inner member; and a shutoff valve being operable in response to movement of the guide pin;

wherein selective movement of the guide pin relative to the outer member in one direction causes movement of the shutoff valve for establishing fluid communication from the exhaust port of the pressure head, through the first and second openings of the inner member and to the aperture of the outer member and movement of the guide pin relative to the outer member in another direction causes movement of the shutoff valve for preventing fluid communication from the exhaust port, through the first and second openings of the inner member and to the aperture of the outer member.

* * * * *